(12) United States Patent
Kumarasamy et al.

(10) Patent No.: US 8,849,762 B2
(45) Date of Patent: Sep. 30, 2014

(54) RESTORING COMPUTING ENVIRONMENTS, SUCH AS AUTORECOVERY OF FILE SYSTEMS AT CERTAIN POINTS IN TIME

(75) Inventors: Paramasivam Kumarasamy, Morganville, NJ (US); Amit Mitkar, Neptune, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 0 days.

(21) Appl. No.: 13/076,792

(22) Filed: Mar. 31, 2011

(65) Prior Publication Data

US 2012/0254119 A1 Oct. 4, 2012

(51) Int. Cl.
  *G06F 17/30* (2006.01)
  *G06F 11/14* (2006.01)
(52) U.S. Cl.
  CPC ...... *G06F 11/1469* (2013.01); *G06F 2201/815* (2013.01)
  USPC .......................................... 707/646; 707/704
(58) Field of Classification Search
  USPC ........................................................ 707/646
  See application file for complete search history.

(56) References Cited

U.S. PATENT DOCUMENTS

| | | | |
|---|---|---|---|
| 4,464,122 A | 8/1984 | Fuller et al. |
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,212,784 A | 5/1993 | Sparks |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 09/609,977.

(Continued)

*Primary Examiner* — Mariela Reyes
*Assistant Examiner* — Mohammad Rahman
(74) *Attorney, Agent, or Firm* — Perkins Coie LLP

(57) ABSTRACT

A method and system for restoring a computing environment from a secondary data store, and facilitating such restoration, is described. In some examples, the system copies the configuration parameters of a computing environment, such as a file system, as well as the data within the file system, and transfers the copies to secondary storage for later restoration. For example, the system may generate an xml file of the configuration parameters of the computing environment when a backup operation of the computing environment is performed, and store the xml file along with copies of the data from the computing environment in secondary storage.

14 Claims, 6 Drawing Sheets

(56) References Cited

U.S. PATENT DOCUMENTS

| | | |
|---|---|---|
| 5,333,315 A | 7/1994 | Saether et al. |
| 5,347,653 A | 9/1994 | Flynn et al. |
| 5,386,545 A | 1/1995 | Gombos, Jr. et al. |
| 5,410,700 A | 4/1995 | Fecteau et al. |
| 5,448,718 A | 9/1995 | Cohn et al. |
| 5,448,724 A | 9/1995 | Hayashi |
| 5,485,606 A | 1/1996 | Midgdey et al. |
| 5,491,810 A | 2/1996 | Allen |
| 5,495,607 A | 2/1996 | Pisello et al. |
| 5,504,873 A | 4/1996 | Martin et al. |
| 5,517,405 A | 5/1996 | McAndrew et al. |
| 5,537,568 A | 7/1996 | Yanai et al. |
| 5,544,345 A | 8/1996 | Carpenter et al. |
| 5,544,347 A | 8/1996 | Yanai et al. |
| 5,555,371 A | 9/1996 | Duyanovich et al. |
| 5,559,957 A | 9/1996 | Balk |
| 5,564,037 A | 10/1996 | Lam |
| 5,608,865 A | 3/1997 | Midgely et al. |
| 5,613,134 A | 3/1997 | Lucus et al. |
| 5,619,644 A | 4/1997 | Crockett et al. |
| 5,634,052 A | 5/1997 | Morris |
| 5,638,509 A | 6/1997 | Dunphy et al. |
| 5,659,614 A | 8/1997 | Bailey, III |
| 5,666,501 A | 9/1997 | Jones et al. |
| 5,673,381 A | 9/1997 | Huai et al. |
| 5,673,382 A | 9/1997 | Cannon et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,165 A | 7/1998 | Saxon |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,864,846 A | 1/1999 | Voorhees et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 5,983,239 A | 11/1999 | Cannon |
| 5,991,753 A | 11/1999 | Wilde |
| 6,012,053 A | 1/2000 | Pant et al. |
| 6,021,415 A | 2/2000 | Cannon et al. |
| 6,026,414 A | 2/2000 | Anglin |
| 6,052,735 A | 4/2000 | Ulrich et al. |
| 6,064,821 A | 5/2000 | Shough et al. |
| 6,073,128 A | 6/2000 | Pongracz et al. |
| 6,076,148 A | 6/2000 | Kedem |
| 6,091,518 A | 7/2000 | Anabuki et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,182,198 B1 | 1/2001 | Hubis et al. |
| 6,212,512 B1 | 4/2001 | Barney et al. |
| 6,226,759 B1 | 5/2001 | Miller et al. |
| 6,239,800 B1 | 5/2001 | Mayhew et al. |
| 6,253,217 B1 | 6/2001 | Dourish et al. |
| 6,260,069 B1 | 7/2001 | Anglin |
| 6,266,679 B1 | 7/2001 | Szalwinski et al. |
| 6,266,784 B1 | 7/2001 | Hsiao et al. |
| 6,269,431 B1 * | 7/2001 | Dunham ............ 711/162 |
| 6,275,953 B1 | 8/2001 | Vahalia et al. |
| 6,298,439 B1 | 10/2001 | Beglin |
| 6,301,592 B1 | 10/2001 | Aoyama et al. |
| 6,308,175 B1 | 10/2001 | Lang et al. |
| 6,324,581 B1 | 11/2001 | Xu et al. |
| 6,327,590 B1 | 12/2001 | Chidlovskii et al. |
| 6,327,612 B1 | 12/2001 | Watanabe et al. |
| 6,328,766 B1 | 12/2001 | Long |
| 6,330,570 B1 | 12/2001 | Crighton |
| 6,330,642 B1 | 12/2001 | Carteau |
| 6,341,287 B1 | 1/2002 | Sziklai et al. |
| 6,343,287 B1 | 1/2002 | Kumar et al. |
| 6,343,324 B1 | 1/2002 | Hubis et al. |
| 6,345,288 B1 | 2/2002 | Reed et al. |
| RE37,601 E | 3/2002 | Eastridge et al. |
| 6,356,801 B1 | 3/2002 | Goodman et al. |
| 6,363,462 B1 | 3/2002 | Bergsten |
| 6,367,073 B2 | 4/2002 | Elledge |
| 6,374,363 B1 | 4/2002 | Wu et al. |
| 6,389,432 B1 | 5/2002 | Pothapragada et al. |
| 6,418,478 B1 | 7/2002 | Ignatius et al. |
| 6,421,678 B2 | 7/2002 | Smiga et al. |
| 6,421,711 B1 | 7/2002 | Blumenau et al. |
| 6,442,706 B1 | 8/2002 | Wahl et al. |
| 6,470,332 B1 | 10/2002 | Weschler |
| 6,484,162 B1 | 11/2002 | Edlund et al. |
| 6,487,561 B1 | 11/2002 | Ofek et al. |
| 6,487,644 B1 | 11/2002 | Huebsch et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,540,623 B2 | 4/2003 | Jackson |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,618,771 B1 | 9/2003 | Leja et al. |
| 6,629,110 B2 | 9/2003 | Cane et al. |
| 6,647,399 B2 | 11/2003 | Zaremba |
| 6,658,526 B2 | 12/2003 | Nguyen et al. |
| 6,675,177 B1 | 1/2004 | Webb |
| 6,691,232 B1 | 2/2004 | Wood et al. |
| 6,721,767 B2 | 4/2004 | De Meno et al. |
| 6,732,088 B1 | 5/2004 | Glance |
| 6,732,231 B1 | 5/2004 | Don et al. |
| 6,732,244 B2 | 5/2004 | Ashton et al. |
| 6,745,178 B1 | 6/2004 | Emens et al. |
| 6,795,828 B2 | 9/2004 | Ricketts |
| 6,816,941 B1 | 11/2004 | Carlson et al. |
| 6,820,070 B2 | 11/2004 | Goldman et al. |
| 6,839,741 B1 | 1/2005 | Tsai |
| 6,839,803 B1 | 1/2005 | Loh et al. |
| 6,850,994 B2 | 2/2005 | Gabryjelski |
| 6,860,422 B2 | 3/2005 | Hull et al. |
| 6,865,568 B2 | 3/2005 | Chau |
| 6,871,182 B1 | 3/2005 | Winnard et al. |
| 6,892,221 B2 | 5/2005 | Ricart et al. |
| 6,948,038 B2 | 9/2005 | Berkowitz et al. |
| 6,948,039 B2 * | 9/2005 | Biessener et al. ............ 711/162 |
| 6,957,186 B1 | 10/2005 | Guheen et al. |
| 6,970,997 B2 | 11/2005 | Shibayama et al. |
| 6,976,039 B2 | 12/2005 | Chefalas et al. |
| 6,995,675 B2 | 2/2006 | Curkendall et al. |
| 6,996,616 B1 | 2/2006 | Leighton et al. |
| 7,003,641 B2 | 2/2006 | Prahlad et al. |
| 7,028,079 B2 | 4/2006 | Mastrianni et al. |
| 7,035,880 B1 | 4/2006 | Crescenti et al. |
| 7,039,860 B1 | 5/2006 | Gautestad et al. |
| 7,058,661 B2 | 6/2006 | Ciaramitaro et al. |
| 7,099,901 B2 | 8/2006 | Sutoh et al. |
| 7,107,298 B2 | 9/2006 | Prahlad et al. |
| 7,107,416 B2 | 9/2006 | Stuart et al. |
| 7,133,870 B1 | 11/2006 | Tripp et al. |
| 7,139,826 B2 | 11/2006 | Watanabe et al. |
| 7,139,846 B1 | 11/2006 | Rossi |
| 7,146,387 B1 | 12/2006 | Russo et al. |
| 7,155,421 B1 | 12/2006 | Haldar |
| 7,155,481 B2 | 12/2006 | Prahlad et al. |
| 7,159,081 B2 | 1/2007 | Suzuki |
| 7,171,468 B2 | 1/2007 | Yeung et al. |

(56) References Cited

U.S. PATENT DOCUMENTS

| | | | |
|---|---|---|---|
| 7,171,585 B2 | 1/2007 | Gail et al. | |
| 7,188,141 B2 | 3/2007 | Novaes | |
| 7,240,100 B1 | 7/2007 | Wein et al. | |
| 7,246,207 B2 | 7/2007 | Kottomtharayil et al. | |
| 7,269,664 B2 | 9/2007 | Hutsch et al. | |
| 7,284,033 B2 | 10/2007 | Jhanji | |
| 7,287,047 B2 | 10/2007 | Kavuri | |
| 7,290,017 B1 | 10/2007 | Wang et al. | |
| 7,313,659 B2 | 12/2007 | Suzuki | |
| 7,328,325 B1* | 2/2008 | Solis et al. | 711/202 |
| 7,346,623 B2 | 3/2008 | Prahlad et al. | |
| 7,346,676 B1 | 3/2008 | Swildens et al. | |
| 7,346,751 B2 | 3/2008 | Prahlad et al. | |
| 7,376,947 B2 | 5/2008 | Evers | |
| 7,379,978 B2 | 5/2008 | Anderson et al. | |
| 7,386,535 B1 | 6/2008 | Kalucha et al. | |
| 7,395,282 B1 | 7/2008 | Crescenti et al. | |
| 7,421,460 B2 | 9/2008 | Chigusa et al. | |
| 7,424,543 B2 | 9/2008 | Rice, III | |
| 7,434,219 B2 | 10/2008 | De Meno et al. | |
| 7,457,790 B2 | 11/2008 | Kochunni et al. | |
| 7,472,142 B2 | 12/2008 | Prahlad et al. | |
| 7,496,841 B2 | 2/2009 | Hadfield et al. | |
| 7,565,484 B2 | 7/2009 | Ghosal et al. | |
| 7,577,689 B1 | 8/2009 | Masinter et al. | |
| 7,577,694 B2 | 8/2009 | Nakano et al. | |
| 7,584,469 B2 | 9/2009 | Mitekura et al. | |
| 7,587,715 B1 | 9/2009 | Barrett et al. | |
| 7,593,935 B2 | 9/2009 | Sullivan | |
| 7,596,713 B2 | 9/2009 | Mani-Meitav et al. | |
| 7,603,626 B2 | 10/2009 | Williams et al. | |
| 7,606,844 B2 | 10/2009 | Kottomtharayil | |
| 7,610,285 B1 | 10/2009 | Zoellner et al. | |
| 7,668,884 B2 | 2/2010 | Prahlad et al. | |
| 7,676,542 B2 | 3/2010 | Moser et al. | |
| 7,689,899 B2 | 3/2010 | Leymaster et al. | |
| 7,730,031 B2 | 6/2010 | Forster | |
| 7,734,593 B2 | 6/2010 | Prahlad et al. | |
| 7,734,669 B2 | 6/2010 | Kottomtharayil et al. | |
| 7,751,628 B1 | 7/2010 | Reisman | |
| 7,761,409 B2 | 7/2010 | Stefik et al. | |
| 7,792,789 B2 | 9/2010 | Prahlad et al. | |
| 7,801,871 B2 | 9/2010 | Gosnell | |
| 7,814,118 B2 | 10/2010 | Kottomtharayil et al. | |
| 7,827,266 B2* | 11/2010 | Gupta | 709/223 |
| 7,831,793 B2 | 11/2010 | Chakravarty et al. | |
| 7,840,537 B2 | 11/2010 | Gokhale et al. | |
| 7,844,676 B2 | 11/2010 | Prahlad et al. | |
| 7,865,517 B2 | 1/2011 | Prahlad et al. | |
| 7,882,077 B2 | 2/2011 | Gokhale et al. | |
| 7,882,093 B2 | 2/2011 | Kottomtharayil et al. | |
| 7,937,393 B2 | 5/2011 | Prahlad et al. | |
| 7,937,420 B2 | 5/2011 | Tabellion et al. | |
| 7,937,702 B2 | 5/2011 | De Meno et al. | |
| 7,984,063 B2 | 7/2011 | Kottomtharayil et al. | |
| 8,037,028 B2 | 10/2011 | Prahlad et al. | |
| 8,055,627 B2 | 11/2011 | Prahlad et al. | |
| 8,060,514 B2 | 11/2011 | Arrouye et al. | |
| 2002/0032878 A1 | 3/2002 | Karpf | |
| 2002/0049883 A1 | 4/2002 | Schneider et al. | |
| 2002/0120858 A1 | 8/2002 | Porter et al. | |
| 2003/0046313 A1* | 3/2003 | Leung et al. | 707/204 |
| 2003/0050979 A1 | 3/2003 | Takahashi | |
| 2003/0101086 A1 | 5/2003 | San Miguel | |
| 2004/0039689 A1 | 2/2004 | Penney et al. | |
| 2004/0267815 A1 | 12/2004 | De Mes | |
| 2005/0039069 A1 | 2/2005 | Prahlad et al. | |
| 2005/0097070 A1 | 5/2005 | Enis et al. | |
| 2005/0251786 A1 | 11/2005 | Citron et al. | |
| 2005/0278207 A1 | 12/2005 | Ronnewinkel | |
| 2006/0036619 A1 | 2/2006 | Fuerst et al. | |
| 2006/0070061 A1 | 3/2006 | Cox et al. | |
| 2006/0115802 A1 | 6/2006 | Reynolds | |
| 2006/0116999 A1 | 6/2006 | Dettinger et al. | |
| 2006/0149604 A1 | 7/2006 | Miller | |
| 2006/0149724 A1 | 7/2006 | Ritter et al. | |
| 2006/0224846 A1 | 10/2006 | Amarendran et al. | |
| 2006/0282900 A1 | 12/2006 | Johnson et al. | |
| 2007/0022145 A1 | 1/2007 | Kavuri | |
| 2007/0028229 A1 | 2/2007 | Knatcher | |
| 2007/0043715 A1 | 2/2007 | Kaushik et al. | |
| 2007/0061266 A1 | 3/2007 | Moore et al. | |
| 2007/0061298 A1 | 3/2007 | Wilson et al. | |
| 2007/0136541 A1 | 6/2007 | Herz et al. | |
| 2007/0166674 A1 | 7/2007 | Kochunni et al. | |
| 2007/0185915 A1* | 8/2007 | Prahlad et al. | 707/200 |
| 2007/0214330 A1 | 9/2007 | Minami et al. | |
| 2007/0226320 A1 | 9/2007 | Hager et al. | |
| 2007/0250810 A1 | 10/2007 | Tittizer et al. | |
| 2007/0296258 A1 | 12/2007 | Calvert et al. | |
| 2008/0126302 A1* | 5/2008 | Mora et al. | 707/3 |
| 2008/0229037 A1* | 9/2008 | Bunte et al. | 711/162 |
| 2008/0243855 A1 | 10/2008 | Prahlad et al. | |
| 2008/0243879 A1* | 10/2008 | Gokhale et al. | 707/100 |
| 2008/0282048 A1 | 11/2008 | Miura | |
| 2008/0288947 A1 | 11/2008 | Gokhale et al. | |
| 2008/0288948 A1 | 11/2008 | Attarde et al. | |
| 2008/0320319 A1 | 12/2008 | Muller et al. | |
| 2009/0171883 A1 | 7/2009 | Kochunni et al. | |
| 2009/0177719 A1 | 7/2009 | Kavuri | |
| 2009/0319534 A1* | 12/2009 | Gokhale | 707/10 |
| 2009/0319585 A1 | 12/2009 | Gokhale | |
| 2009/0320029 A1 | 12/2009 | Kottomtharayil | |
| 2009/0320033 A1 | 12/2009 | Gokhale et al. | |
| 2009/0320037 A1 | 12/2009 | Gokhale et al. | |
| 2010/0031017 A1 | 2/2010 | Gokhale et al. | |
| 2010/0070466 A1 | 3/2010 | Prahlad et al. | |
| 2010/0070474 A1 | 3/2010 | Lad | |
| 2010/0070725 A1* | 3/2010 | Prahlad et al. | 711/162 |
| 2010/0070726 A1* | 3/2010 | Ngo et al. | 711/162 |
| 2010/0076932 A1 | 3/2010 | Lad | |
| 2010/0114837 A1 | 5/2010 | Prahlad et al. | |
| 2010/0332456 A1* | 12/2010 | Prahlad et al. | 707/664 |
| 2011/0093471 A1 | 4/2011 | Brockway et al. | |
| 2011/0173171 A1 | 7/2011 | De Meno et al. | |
| 2011/0173207 A1 | 7/2011 | Kottomtharayil et al. | |
| 2012/0265754 A1 | 10/2012 | Kottomtharayil et al. | |
| 2012/0317085 A1* | 12/2012 | Green et al. | 707/704 |
| 2013/0145376 A1 | 6/2013 | Gokhale et al. | |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0910019 | 4/1999 |
| EP | 0981090 A1 | 2/2000 |
| EP | 0986011 | 3/2000 |
| EP | 1035690 | 9/2000 |
| GB | 2216368 A | 10/1989 |
| JP | 07-046271 A | 2/1995 |
| JP | 7073080 A | 3/1995 |
| JP | 8044598 A | 2/1996 |
| JP | 2000035969 | 2/2000 |
| JP | 2003531435 | 10/2003 |
| WO | WO-9513580 A1 | 5/1995 |
| WO | WO-9912098 | 3/1999 |
| WO | WO-00/58865 | 10/2000 |
| WO | WO-01/06368 | 1/2001 |
| WO | WO-01/16693 | 3/2001 |
| WO | WO-0180005 | 10/2001 |

OTHER PUBLICATIONS

U.S. Appl. No. 13/250,349, filed Sep. 30, 2011, Prahlad.
U.S. Appl. No. 13/343,034, filed Jan. 4, 2012, Prahlad.
Armstead et al., "Implementation of a Campus-wide Distributed Mass Storage Service: The Dream vs. Reality," *IEEE*, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

(56) References Cited

OTHER PUBLICATIONS

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Microsoft Press Computer Dictionary Third Edition, "Data Compression," Microsoft Press, 1997, p. 130.

Rosenblum et al., "The Design and Implementation of a Log-Structured File System," *Operating Systems Review SIGOPS*, vol. 25, No. 5, New York, US, pp. 1-15 (May 1991).

Veeravalli, B., "Network Caching Strategies for a Shared Data Distribution for a Predefined Service Demand Sequence," IEEE Transactions on Knowledge and Data Engineering, vol. 15, No. 6, Nov./Dec. 2003, pp. 1487-1497.

Hennessy et al., "Computer Architecture—A Quantitative Approach", 2nd Edition, 1996, pp. 246-250.

U.S. Appl. No. 13/801,625, filed Mar. 13, 2013, Yongtao et al.

Extended European Search Report for Application No. EP 09767119, Mail date Feb. 11, 2013, 12 pages.

PCT International Search Report for International Application No. PCT/US09/32325, date of mailing Mar. 17, 2009, 11 pages.

Pitoura et al., "Locating Objects in Mobile Computing", IEEE Transactions on Knowledge and Data Engineering, vol. 13, No. 4, Jul./Aug. 2001, pp. 571-592.

Rowe et al., "Indexes for User Access to Large Video Databases", Storage and Retrieval for Image and Video Databases II, IS,& T/SPIE Symp. on Elec. Imaging Sci. & Tech., Feb. 1994, pp. 1-12.

\* cited by examiner

RESTORING COMPUTING ENVIRONMENTS, SUCH AS AUTORECOVERY OF FILE SYSTEMS AT CERTAIN POINTS IN TIME

BACKGROUND

Data storage systems facilitate the retention and subsequent recovery of electronic data produced by computing systems. Often, data is stored remotely from a computing system, in secondary or even tertiary storage devices. Example storage devices may include magnetic tapes, optical disks, flash memory, and so on. Data is retained for a wide variety of purposes, such as for compliance purposes, backup purposes, and so on. Once data is no longer needed to be readily or quickly available, it may be sent to archive storage or other long-term storage.

Typically, recovery of a computing environment, such as a file system and its associated data, required many steps to be performed. For example, an administrator may boot up a live CD to establish an interface, such as an ISO image, in which to restore the environment. Once running, the interface may request parameters to be entered by the administrator, such as host specific parameters (e.g., name, IP address, name of server that contains the restoration data, and so on). Once the parameters are received, the interface may request information regarding the system configuration or data set that the administrator would like to be restored (e.g., what point in time, and so on). Once receiving this information, the interface may restore the computing environment and data, as desired by the administrator. Utilization of such conventional multi-touch or multi-stage recovery techniques of a computing environment can be time consuming, costly, and resource intensive, among other problems.

There is a need for a system that overcomes the above problems, as well as providing additional benefits.

DETAILED DESCRIPTION

Overview

Figure 1:
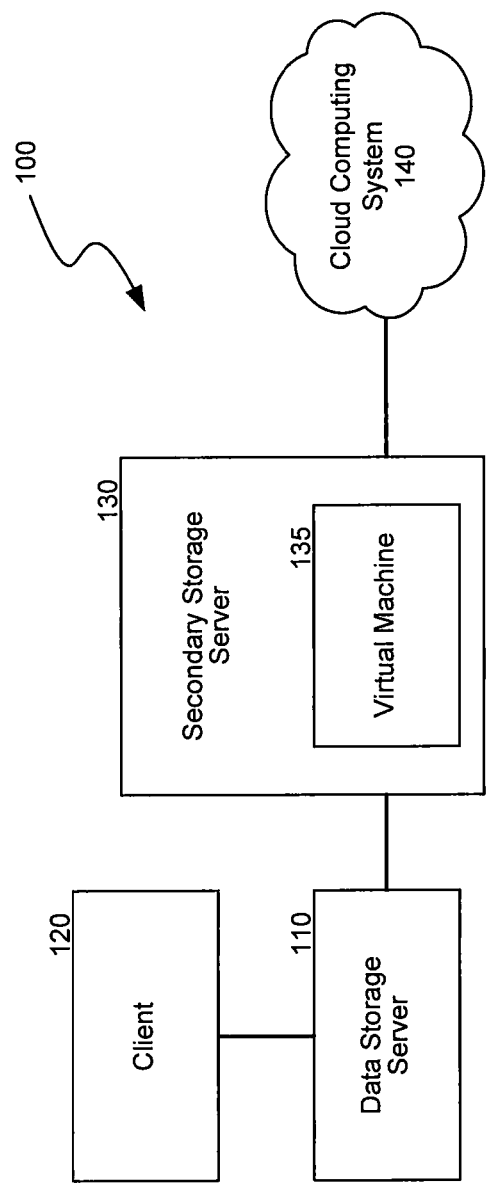
FIG. 1 is a block diagram illustrating a computing environment in which aspects of the system may be implemented.

A method and system for restoring a computing environment from a secondary data store, and facilitating such restoration, is described. In some examples, the system copies the configuration parameters of a computing environment, such as a file system, as well as the data within the file system, and transfers the copies to secondary storage for later restoration. For example, the system may generate an xml file of the configuration parameters of the computing environment when a backup operation of the computing environment is performed, and store the xml file along with copies of the data from the computing environment in secondary storage.

In some examples, the system restores and/or recovers a computing environment by mounting and booting a live CD, retrieving the configuration parameter information, and retrieving the data. For example, upon mount a live CD, an interface is established that provisions a new computing environment, retrieves an xml file containing the configuration parameters of the computing environment to be restored, and locates and restores the data associated with the recovered computing environment.

In some examples, the system may utilize a cloud computing environment, such as a virtual machine or virtual layer hosted by a secondary storage environment, in order to facilitate the restoring of a computing environment. For example, a backup or other data copy process, the system transfers an xml file containing configuration information for a computing environment along with the computing environment to cloud-based computing resources. Having access to the configuration information, the cloud-based resources may host and/or stage the computing environment in anticipation of future recovery requests. In response to a recovery request, the system may locate the staged computing environment, restore data associated with the computing environment, and provide a fully restored computing environment.

The system, therefore, enables administrators and other users to quickly (e.g., with few touches or inputs) restore a computing environment at a specified point in time, among other benefits. Unlike conventional systems that may only store the data of a system or require a data restoration interface to poll a user for information regarding a desired configuration of a restored computing environment, the inventors have realized that providing configuration information to a bootable CD and/or staging computing environments in a cloud-based computing systems accessible by virtual environments enables a data storage system to quickly and efficiently recover computing environments, such as file systems, to users upon request.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

The terminology used in the description presented below is intended to be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 2:
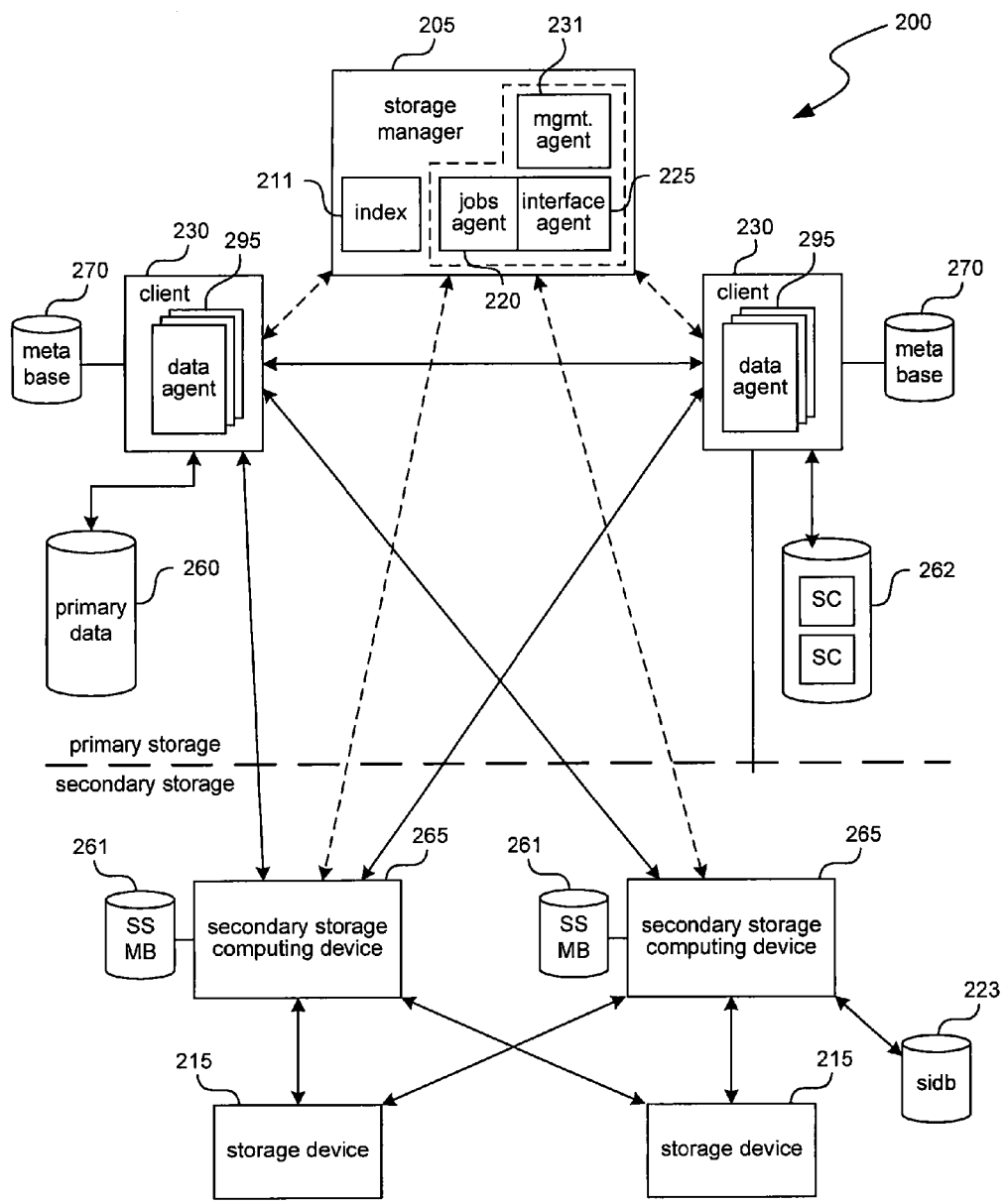
FIG. 2 is a block diagram illustrating a suitable data storage system in which aspects of the system may be implemented.

FIGS. 1 and 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other tangible data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

FIG. 1 is a block diagram illustrating a computing environment 100 in which aspects of the system may be implemented. The computing environment 100 includes a data storage server 110, such as a server that is part of a data storage system. For example, the data storage server 110 may be a storage operation cell as described with respect to FIG. 2, or other data storage resources that perform storage operations and/or storage management functions. The data storage server 120 performs and/or manages storage operations for a client 120. The client 120 may be any computing system capable of providing a computing environment to a user, such as a file system. For example, the client 120 may be a personal computer, server, or other computing environment that creates and/or modifies production data as primary copies of data.

The data storage server 110 may perform various copy operations to make secondary copies of the data within the client 120, and may transfer copies of the data to a secondary storage server 130. Additionally, the data storage server 110 may perform various copy operations of information associated with the configuration of the computing environment of the client 120, such as configuration parameters or metadata. The secondary storage server 130 may include a secondary data store, such as one or more secondary storage devices (e.g., magnetic tape, optical disks, and so on). The secondary storage server 130 may also host various resources capable of expanding its physical storage capacity, such as a virtual layer or virtual machine 135 that utilizes resources within a cloud computing system 140. The cloud computing system 140 may provide computation resources, software resources, data access resources, data storage resources, and so on, to the secondary storage server 130 and/or the data storage server 110. For example, the cloud computing system 140 may maintain and/or establish a portion of a restored computing environment to the data storage server 110 during restoration of a computing environment originally provided at the client 120.

As described herein, in some examples, the secondary storage server 130 includes a virtual layer 135 configured to expand the storage capacity and provide other resources to the secondary storage server 130 by providing a virtual computing environment. In general, virtualization refers to the simultaneous hosting of one or more operating systems on a physical computer. Such virtual operating systems and their associated virtual resources are called virtual machines. Virtualization software sits between the virtual machines and the hardware of the physical computer. The applications may be any applications (e.g., database applications, file server applications mail server applications, web server applications, transaction processing applications, UPnP serving applications, media streaming applications, data storage applications, data restoration applications, and so on) that may run on the operating system. The virtual machine may also be connected to the various networks described herein.

The operating system may be connected to the virtual storage disks via the SAN, which may be any type of SAN, such as a Fibre Channel SAN, an iSCSI SAN, or any other type of SAN. A primary storage data store may store the virtual disks of the virtual machine hosted by the virtual layer 135. A virtual disk may correspond to one or more files (e.g., one or more *.vmdk or *.vhd files) on the primary storage data store. The primary storage data store may store a primary copy of the data of the virtual machine. Additionally or alternatively, the virtual disks may be stored by other storage devices in a data storage system, such as in the data store. Further details regarding the operation and components of the virtual layer 135 may be found in U.S. patent application Ser. No. 12/553,294, filed on Sep. 3, 2009, entitled SYSTEMS AND METHODS FOR MANAGEMENT OF VIRTUALIZATION DATA, which is incorporated by reference in its entirety.

As discussed herein, in some examples, the system facilitates the storage and/or restoration of data from a computing environment (e.g., an environment at client 120) to secondary storage resources (e.g., secondary storage server 130). Further details regarding the components and processes utilized in the creating and storing of data, such as the migrating of data from secondary storage to archive storage, and the various hardware and software computing resources that implement the components shown in FIG. 1, will now be discussed with respect to FIG. 2. FIG. 2 is a block diagram illustrating various components and resources of a suitable data storage system 200.

The resources in the data storage system 200 may employ the processes and techniques described herein. The data storage system 200 includes a storage manager 205, one or more data agents 295, one or more secondary storage computing devices 265, one or more storage devices 215, one or more clients 230, one or more data or information stores 260 and 262, a single instancing database 223, an index 211, a jobs agent 220, an interface agent 225, and a management agent 231. The system 200 may represent a modular storage system such as the CommVault QiNetix system, and also the CommVault GALAXY backup system, available from CommVault Systems, Inc. of Oceanport, N.J., aspects of which are further described in commonly-assigned U.S. Pat. No. 7,035,880, the entirety of which is incorporated by reference herein.

The system 200 may also represent a modular storage system such as the CommVault Simpana system, also available from CommVault Systems, Inc.

The data storage system 200 may generally include combinations of hardware and software components associated with performing storage operations on electronic data. Storage operations include copying, backing up, creating, storing, retrieving, and/or migrating primary storage data (e.g., data stores 260 and/or 262) and secondary storage data (which may include, for example, snapshot copies, backup copies, HSM copies, archive copies, and other types of copies of electronic data stored on storage devices 215). The system 200 may provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some examples, storage operations may be performed according to various storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain data is to be stored in the storage device 215, retained for a specified period of time before being aged to another tier of secondary storage, copied to the storage device 215 using a specified number of data streams, and so on.

A "schedule policy" may specify a frequency with which to perform storage operations and a window of time within which to perform them. For example, a schedule policy may specify that a storage operation is to be performed every Saturday morning from 2:00 a.m. to 4:00 a.m. In some cases, the storage policy includes information generally specified by the schedule policy. (Put another way, the storage policy includes the schedule policy.) Storage policies and/or schedule policies may be stored in a database of the storage manager 205, to archive media as metadata for use in restore operations or other storage operations, or to other locations or components of the system 200.

The system 200 may comprise a storage operation cell that is one of multiple storage operation cells arranged in a hierarchy or other organization. Storage operation cells may be related to backup cells and provide some or all of the functionality of backup cells as described in commonly-assigned U.S. Pat. No. 7,395,282, which is incorporated herein by reference in its entirety. However, storage operation cells may also perform additional types of storage operations and other types of storage management functions that are not generally offered by backup cells.

Storage operation cells may contain not only physical devices, but also may represent logical concepts, organizations, and hierarchies. For example, a first storage operation cell may be configured to perform a first type of storage operations such as HSM operations, which may include backup or other types of data migration, and may include a variety of physical components including a storage manager 205 (or management agent 231), a secondary storage computing device 265, a client 230, and other components as described herein. A second storage operation cell may contain the same or similar physical components; however, it may be configured to perform a second type of storage operations, such as storage resource management ("SRM") operations, and may include monitoring a primary data copy or performing other known SRM operations.

Thus, as can be seen from the above, although the first and second storage operation cells are logically distinct entities configured to perform different management functions (HSM and SRM, respectively), each storage operation cell may contain the same or similar physical devices. Alternatively, different storage operation cells may contain some of the same physical devices and not others. For example, a storage operation cell configured to perform SRM tasks may contain a secondary storage computing device 265, client 230, or other network device connected to a primary storage volume, while a storage operation cell configured to perform HSM tasks may instead include a secondary storage computing device 265, client 230, or other network device connected to a secondary storage volume and not contain the elements or components associated with and including the primary storage volume. (The term "connected" as used herein does not necessarily require a physical connection; rather, it could refer to two devices that are operably coupled to each other, communicably coupled to each other, in communication with each other, or more generally, refer to the capability of two devices to communicate with each other.) These two storage operation cells, however, may each include a different storage manager 205 that coordinates storage operations via the same secondary storage computing devices 265 and storage devices 215. This "overlapping" configuration allows storage resources to be accessed by more than one storage manager 205, such that multiple paths exist to each storage device 215 facilitating failover, load balancing, and promoting robust data access via alternative routes.

Alternatively or additionally, the same storage manager 205 may control two or more storage operation cells (whether or not each storage operation cell has its own dedicated storage manager 205). Moreover, in certain embodiments, the extent or type of overlap may be user-defined (through a control console) or may be automatically configured to optimize data storage and/or retrieval.

Data agent 295 may be a software module or part of a software module that is generally responsible for performing storage operations on the data of the client 230 stored in data store 260/262 or other memory location. Each client 230 may have at least one data agent 295 and the system 250 can support multiple clients 230. Data agent 295 may be distributed between client 230 and storage manager 205 (and any other intermediate components), or it may be deployed from a remote location or its functions approximated by a remote process that performs some or all of the functions of data agent 295.

The overall system 200 may employ multiple data agents 295, each of which may perform storage operations on data associated with a different application. For example, different individual data agents 295 may be designed to handle Microsoft Exchange data, Lotus Notes data, Microsoft Windows 2000 file system data, Microsoft Active Directory Objects data, and other types of data known in the art. Other examples may employ one or more generic data agents 295 that can handle and process multiple data types rather than using the specialized data agents described above.

If a client 230 has two or more types of data, one data agent 295 may be required for each data type to perform storage operations on the data of the client 230. For example, to back up, migrate, and restore all the data on a Microsoft Exchange 2000 server, the client 230 may use one Microsoft Exchange 2000 Mailbox data agent 295 to back up the Exchange 2000 mailboxes, one Microsoft Exchange 2000 Database data agent 295 to back up the Exchange 2000 databases, one Microsoft Exchange 2000 Public Folder data agent 295 to back up the Exchange 2000 Public Folders, and one Microsoft Windows 2000 File System data agent 295 to back up the file system of the client 230. These data agents 295 would be treated as four separate data agents 295 by the system even though they reside on the same client 230.

Alternatively, the overall system 200 may use one or more generic data agents 295, each of which may be capable of handling two or more data types. For example, one generic data agent 295 may be used to back up, migrate and restore Microsoft Exchange 2000 Mailbox data and Microsoft Exchange 2000 Database data while another generic data agent 295 may handle Microsoft Exchange 2000 Public Folder data and Microsoft Windows 2000 File System data, and so on.

Data agents 295 may be responsible for arranging or packing data to be copied or migrated into a certain format, such as an archive file. Nonetheless, it will be understood that this represents only one example, and any suitable packing or containerization technique or transfer methodology may be used if desired. Such an archive file may include metadata, a list of files or data objects copied, the file, and data objects themselves. Moreover, any data moved by the data agents may be tracked within the system by updating indexes associated with appropriate storage managers 205 or secondary storage computing devices 265. As used herein, a file or a data object refers to any collection or grouping of bytes of data that can be viewed as one or more logical units.

Storage manager 205 may be a software module or other application that coordinates and controls storage operations performed by the system 200. Storage manager 205 may communicate with some or all elements of the system 200, including clients 230, data agents 295, secondary storage computing devices 265, and storage devices 215, to initiate and manage storage operations (e.g., backups, migrations, data recovery operations), and so on.

Storage manager 205 may include a jobs agent 220 that monitors the status of some or all storage operations previously performed, currently being performed, or scheduled to be performed by the system 250. Jobs agent 220 may be communicatively coupled to an interface agent 225 (e.g., a software module or application). Interface agent 225 may include information processing and display software, such as a graphical user interface ("GUI"), an application programming interface ("API"), or other interactive interface through which users and system processes can retrieve information about the status of storage operations. For example, in an arrangement of multiple storage operations cell, through interface agent 225, users may optionally issue instructions to various storage operation cells regarding performance of the storage operations as described and contemplated herein. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network, to monitor the status of certain components in a particular storage operation cell (e.g., the amount of storage capacity left in a particular storage device 1015), to provide criteria for searches of data stored in storage devices, and so on.

Storage manager 205 may also include a management agent 231 that is typically implemented as a software module or application program. In general, management agent 231 provides an interface that allows various management agents 231 in other storage operation cells to communicate with one another. For example, assume a certain network configuration includes multiple storage operation cells hierarchically arranged or otherwise logically related in a WAN or LAN configuration. With this arrangement, each storage operation cell may be connected to the other through each respective interface agent 225. This allows each storage operation cell to send and receive certain pertinent information from other storage operation cells, including status information, routing information, information regarding capacity and utilization, etc. These communications paths may also be used to convey information and instructions regarding storage operations.

For example, a management agent 231 in a first storage operation cell may communicate with a management agent 231 in a second storage operation cell regarding the status of storage operations in the second storage operation cell. Another illustrative example includes the case where a management agent 231 in a first storage operation cell communicates with a management agent 231 in a second storage operation cell to control storage manager 205 (and other components) of the second storage operation cell via management agent 231 contained in storage manager 205.

Another example is the case where management agent 231 in a first storage operation cell communicates directly with and controls the components in a second storage operation cell and bypasses the storage manager 205 in the second storage operation cell. If desired, storage operation cells can also be organized hierarchically such that hierarchically superior cells control or pass information to hierarchically subordinate cells or vice versa.

Storage manager 205 may also maintain an index, a database, or other data structure 211. The data stored in database 211 may be used to indicate logical associations between components of the system, user preferences, management tasks, media containerization and data storage information, or other useful data. For example, the storage manager 205 may use data from database 211 to track logical associations between secondary storage computing device 265 and storage devices 215 (or movement of data as containerized from primary to secondary storage).

Generally speaking, the secondary storage computing device 265, which may also be referred to as a media agent, may be implemented as a software module that conveys or transfers data, as directed by storage manager 205, between a client 230 and one or more storage devices 215, such as a tape library, a magnetic media storage device, an optical media storage device, or any other suitable storage device. In some examples, secondary storage computing device 265 may be communicatively coupled to and control a storage device 215. A secondary storage computing device 265 may be considered to be associated with a particular storage device 215 if that secondary storage computing device 265 is capable of routing and storing data to that particular storage device 215.

In operation, a secondary storage computing device 265 associated with a particular storage device 215 may instruct the storage device to use a robotic arm or other retrieval means to load or eject a certain storage media, and to subsequently archive, migrate, or restore data to or from that media. Secondary storage computing device 265 may communicate with a storage device 215 via a suitable communications path such as a SCSI or Fibre Channel communications link. In some embodiments, the storage device 215 may be communicatively coupled to the storage manager 205 via a SAN.

Each secondary storage computing device 265 may maintain an index, a database, or other data structure 261 that may store index data generated during storage operations for secondary storage (SS) as described herein, including creating a metabase (MB). For example, performing storage operations on Microsoft Exchange data may generate index data. Such index data provides a secondary storage computing device 265 or other external device with a fast and efficient mechanism for locating data stored or backed up. Thus, a secondary storage computing device index 261, or a database 211 of a storage manager 205, may store data associating a client 230 with a particular secondary storage computing device 265 or storage device 215, for example, as specified in a storage policy, while a database or other data structure in secondary storage computing device 265 may indicate where specifically the data of the client 230 is stored in storage device 215, what specific files were stored, and other information associated with storage of the data of the client 230. In some examples, such index data may be stored along with the data backed up in a storage device 215, with an additional copy of the index data written to index cache in a secondary storage device. Thus the data is readily available for use in storage operations and other activities without having to be first retrieved from the storage device 215.

Generally speaking, information stored in a cache is typically recent information that reflects certain particulars about operations that have recently occurred. After a certain period of time, this information is sent to secondary storage and tracked. This information may need to be retrieved and uploaded back into a cache or other memory in a secondary computing device before data can be retrieved from storage device 215. In some examples, the cached information may include information regarding format or containerization of archives or other files stored on storage device 215.

One or more of the secondary storage computing devices 265 may also maintain one or more single instance databases 223. Single instancing (alternatively called data deduplication) generally refers to storing in secondary storage only a single instance of each data object (or data block) in a set of data (e.g., primary data). More details as to single instancing may be found in one or more of the following previously-referenced U.S. patent application Ser. Nos. 11/269,512, 12/145,347, 12/145,342, 11/963,623, 11/950,376, and 61/100,686, which are incorporated by reference in their entirety.

In some examples, the secondary storage computing devices 265 maintain one or more variable instance databases. Variable instancing generally refers to storing in secondary storage one or more instances, but fewer than the total number of instances, of each data object (or data block) in a set of data (e.g., primary data). More details as to variable instancing may be found in the previously-referenced U.S. Patent Application No. 61/164,803, which is incorporated by reference in its entirety.

In some examples, certain components may reside and execute on the same computer. For example, in some embodiments, a client 230 such as a data agent 295, or a storage manager 205, coordinates and directs local archiving, migration, and retrieval application functions as further described in the previously-referenced U.S. patent application Ser. No. 09/610,738, which is incorporated by reference in its entirety. This client 230 can function independently or together with other similar clients 230.

The secondary storage computing devices 265 each has its own associated metabase 261. Each client 230 may also have its own associated metabase 270. However in some embodiments, each "tier" of storage, such as primary storage, secondary storage, tertiary storage, etc., may have multiple metabases or a centralized metabase, as described herein. For example, rather than a separate metabase or index associated with each client 230, the metabases on this storage tier may be centralized. Similarly, second and other tiers of storage may have either centralized or distributed metabases. Moreover, mixed architecture systems may be used if desired, that may include a first tier centralized metabase system coupled to a second tier storage system having distributed metabases and vice versa, and so on.

Moreover, in operation, a storage manager 205 or other management module may keep track of certain information that allows the storage manager 205 to select, designate, or otherwise identify metabases to be searched in response to certain queries as further described herein. Movement of data between primary and secondary storage may also involve movement of associated metadata and other tracking information as further described herein.

In some examples, primary data may be organized into one or more sub-clients. A sub-client is a portion of the data of one or more clients 230, and can contain either all of the data of the clients 230 or a designated subset thereof. As depicted in FIG. 10, the data store 262 includes two sub-clients. For example, an administrator (or other user with the appropriate permissions; the term administrator is used herein for brevity) may find it preferable to separate email data from financial data using two different sub-clients having different storage preferences, retention criteria, and so on.

In some examples, the data storage system 200 includes a content indexing component (not shown). The context indexing component may select a copy of data to be indexed or stored, identify content within the copy of the data, and update an index of content to make the content available for searching or other purposes. For example, the component may add information such as the location of the content, keywords found within the content, and other supplemental information about the content that may be helpful for locating the content during a search.

Thus, computing environment 100 and/or data storage system 200 may include a request component configured to receive a request to restore a computing environment at a specified point in time, a configuration component configured to configure a restoration interface using a configuration file associated with the computing environment, and/or a retrieval component configured to retrieve data associated with the computing environment.

Storing Parameters of a Computing Environment Along with Associated Data

Figure 3:
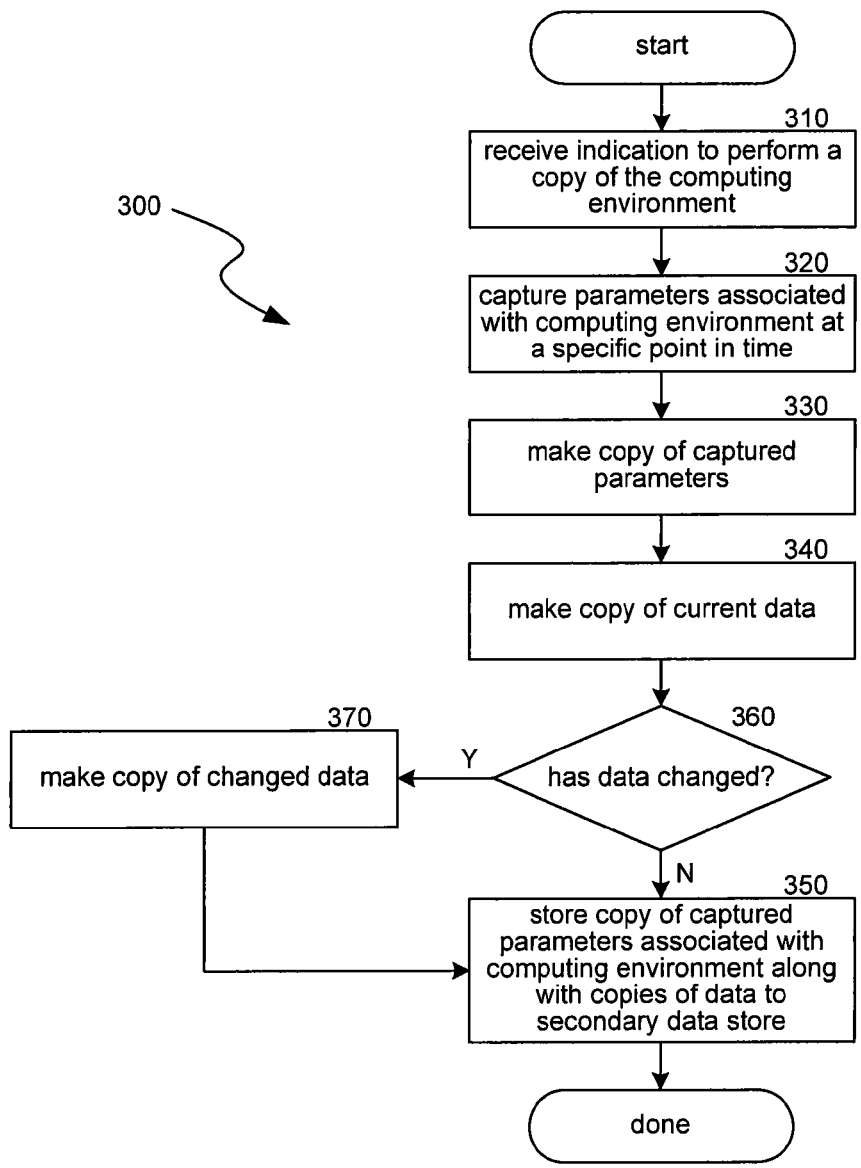
FIG. 3 is a flow diagram illustrating a routine for storing data along with parameters of a computing environment in a secondary data store.

As described herein, the system, in some examples, facilitates the restoration of a computing environment by storing configuration parameters of a computing environment along with data from the computing environment in secondary storage. FIG. 3 is a flow diagram illustrating a routine 300 for storing data along with parameters of a computing environment in a secondary data store.

In step 310, the system receives an indication to generate a copy of a computing environment, such as a file system. For example, a data storage server 110 receives instructions from a storage management server within a hierarchical data storage system to create and/or generate a secondary copy of the file system at client 120.

In step 320, the system captures parameters associated with the computing environment at a specified point in time and/or state of the computing environment. For example, the data storage server 110 performs a copy operation of the configuration parameters associated with the file system of client 120. The data storage server 110 may copy various metadata, such as a host name of the file system, the IP or network address of the file system, disk layout information, time information, data storage information, and other metadata providing information for a system at a specified point in time. That is, the system captures some or all parameters of a system that identify the state of the system at a certain point in time, such as parameters associated with the device and processes composing a system.

For example, the data storage server 110 may capture some or all parameters from a system configuration xml file, such as:

```
<system_configuration>
    <site name="client1" >
        <hosts>
            <host_ref name="host1"/>
        </hosts>
    </site>
    <group name="mysql" gid="500"/>
    <user name="mysql" uid="500">
        <groups>
            <group_ref name="mysql"/>
        </groups>
    </user>
    <host name="host1" >
        <users>
            <user_ref name="mysql">
        </users>
        <profiles>
            <profile_ref name="workstation"/>
        </profiles>
    </host>
    <profile name="workstation" >
        <components>
            <component_ref name="user-setup" >
            <component_ref name="mysql-db" >
        </components>
    </profile>
    <component name="user-setup">
    </component>
    <component name="mysql-db">
    </component>
</system_configuration>
```

In step 330, the system makes a copy of the captured parameters. The system may perform some or all of the copy operations described herein when making a copy of the system configuration. For example, the data storage server 110 may make an xml copy of the system configuration file of the computing environment of client 120. In step 340, the system makes a copy of the current data within the computing environment, such as the data generated by the file system. For example, the data storage server 110 may create one or more secondary copies of data stored at client 120, such as those described herein.

In step 350, the system transfers the copy of the captured parameters associated with the computing environment along with one or more copies of the data within the computing environment to secondary storage. For example, the data storage server 110 may stream or otherwise transfer the copies to the secondary storage server 130.

In some examples, the system may determine, in step 360, whether new data is created within the computing environment. When new data is created, routine 300 may proceed to step 370 and make a copy of the changed data. That is, the system makes a copy of the changed or incremental data within the computing environment, such as the data generated by the file system since a previous copy operation. Thus, in some cases, the system may generate a backup copy of a computing environment that includes one copy of the system configuration of the computing environment, and one or more copies of the data created and/or modified within the computing environment. Further details regarding the storage of secondary copies associated with a computing environment will now be discussed.

Figure 4A:
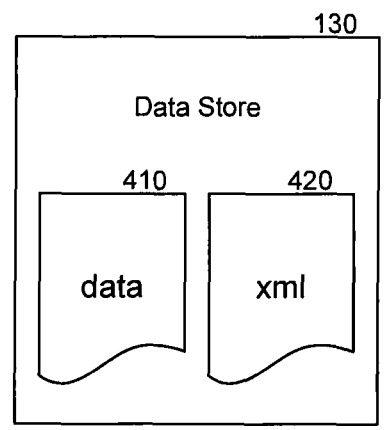
FIG. 4A is a block diagram illustrating data and computing environment parameters stored within a secondary data store.

FIG. 4A is a block diagram illustrating data and computing environment parameters stored within a secondary data store 130. The secondary data store 130 includes one or more secondary copies of data files 410 from a computing environment and a copy of the system configuration 420 of the computing environment. For example, the copy of the system configuration 420 may be an xml file that includes various configuration parameters, such as host name, device identifiers, network addresses, and so on.

Figure 4B:
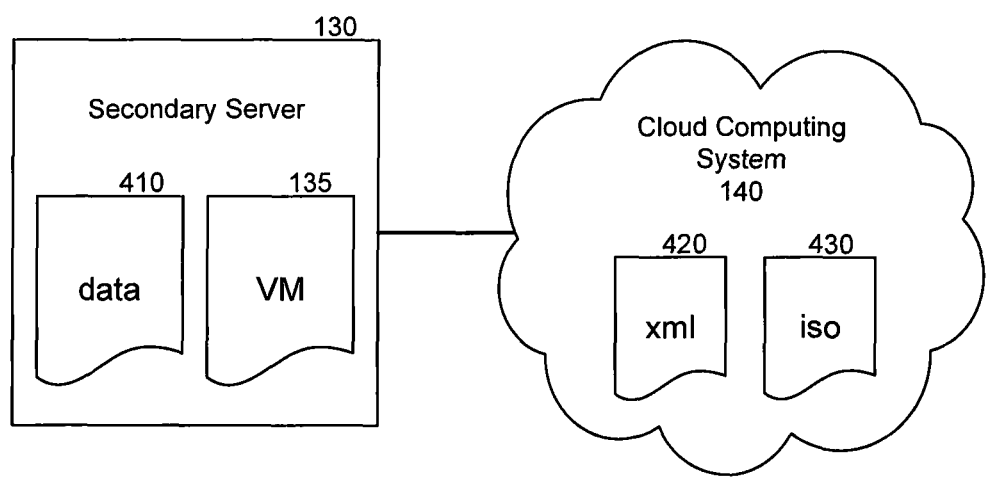
FIG. 4B is a block diagram illustrating data and computing environment parameters stored within a cloud-based secondary data store.

FIG. 4B is a block diagram illustrating data and computing environment parameters stored within a cloud-based computing system 140. As described herein, a secondary storage server 130 communicates with a cloud-based computing system 140 using a virtualization layer 135, such as a virtual machine hosted by the secondary storage server 130. The system, performing some or all of routine 300, may store one or more secondary copies of data files 410 from a computing environment within the secondary storage server 130, and may store a copy of the system configuration 420 of the computing environment in the cloud data store 140. The copy of the system configuration 420 may be an xml file that includes various configuration parameters, such as host name, device identifiers, network addresses, and so on. Furthermore, the system may host a live CD, such as a live CD that boots an ISO image of the computing environment during restoration of the computing environment.

By storing the system configuration copy 420 along with a live CD 430 within the cloud computing system 140, the system may facilitate the hosting and/or staging a computing environment to be restored at later dates. For example, a data storage server 110 may access, via the virtual machine 135, a staged or operable computing environment at various points in time hosted by the cloud computing system 140. Such access facilitates a quick and easy restoration of the computing environment, among other things, which will now be discussed.

Restoring Computing Environments

Figure 5:
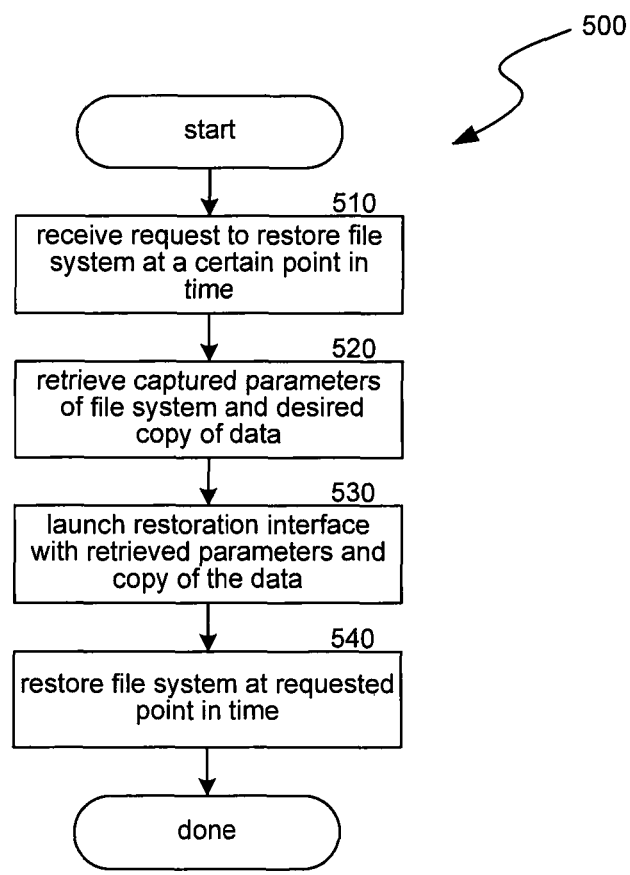
FIG. 5 is flow diagram illustrating a routine for restoring a computing environment from a secondary data store.

As described herein, the system, in some examples, provides for a one-touch or quick restoration of a computing environment, such as a file system. FIG. 5 is flow diagram illustrating a routine 500 for restoring a computing environment from a secondary data store and/or recovering a computing environment on a different computer.

In step 510, the system receives a request to restore a file system (or other computing environment) at a certain point in time. For example, the system, via the data storage server 110, receives a request to recover the computing environment of a computer that crashed.

In step 520, the system retrieves the captured parameters of the file system as well as a desired secondary copy of the data within the file system. For example, the data storage server 110 retrieves one or more secondary copies of the data 410 from the computing environment along with an xml file 420 containing parameters associated with the configuration of the file system.

In step 530, the system boots an interface with the retrieve parameters and the one or more copies of the data. For example, the system boots a live CD and configures the retrieved xml file 420. In step 540, the system restores the file system at the requested point in time. That is, the system provisions a machine with the live CD, configures the provisioned machine with the parameters from the xml file 420, retrieves the data from the secondary copies of the data, and finishes the restoration of the file system. Thus, the system enables a user to simply request restoration of a file system with a desired version of the data, and automatically establishes and configures the file system during restoration.

Figure 6:
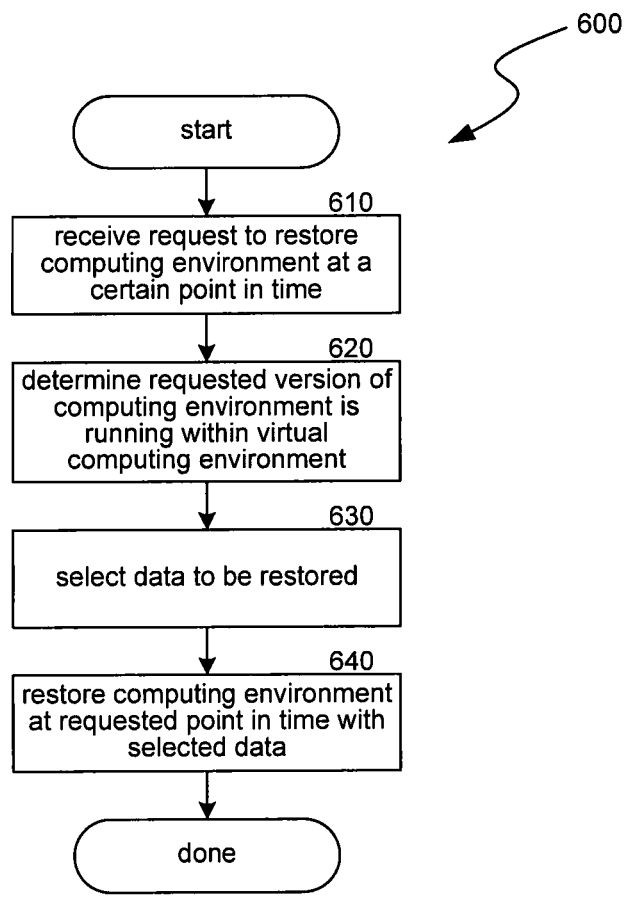
FIG. 6 is a flow diagram illustrating a routine for restoring a computing environment from a cloud-based secondary data store.

In some examples, the system hosts and/or stages a computing environment in advance of requests to restore the computing environment. FIG. 6 is a flow diagram illustrating a routine 600 for restoring a computing environment from a cloud-based secondary data store.

In step 610, the system receives a request to restore a file system (or other computing environment) at a certain point in time. For example, the system, via the data storage server 110, receives a request to recover the computing environment of a computer that is no longer operable.

In step 620, the system determines a requested version of a file system is running and/or staged within a virtual computing environment. For example, the system identifies a version of the file system (e.g., a bootable image and a configuration file) that is available to be restored.

In step 630, the system selects the data to be restored. For example, the system may select one or more secondary copies of the data of the file system to be restored along with the configure file system. That is, the system may select one or more secondary copies from a group of secondary copies performed on different days of the week.

In step 640, the system restores the file system at the requested point in time. That is, the system retrieves the configured file system, retrieves the data from the secondary copies of the data, and finishes the restoration of the file system. Thus, the system enables a user to simply request restoration of a computing environment with a desired version of the data, and automatically provides the computing environment during restoration.

Thus, in some examples, the system enables the restoration of a computing environment, such as a file system, without requiring a requesting user to provide information associated with the computing environment to be restored. By storing system configuration parameters along with data to be recovered, the system, in some examples, automatically provisions, configures, and/or recovers a computing environment. That is, the system may provide one-touch recovery of a computing environment, among other benefits.

CONCLUSION

From the foregoing, it will be appreciated that specific examples and implementations of the system have been described herein for purposes of illustration, but that various modifications may be made without deviating from the spirit and scope of the system. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

We claim:

1. A method for restoring a computing environment of a source device to a previous state of the computing environment, the method comprising:

transferring a state of the computing environment of the source device from a secondary storage server to a cloud-based computing system, wherein the state of the computing environment represents a point in time for the computing environment of the source device, wherein the cloud-based computing system hosts a bootable non-transitory computer-readable storage medium, wherein the state of the computing environment includes a configuration file and sets of data associated with the computing environment, and wherein the secondary storage server hosts a virtual machine and accesses the cloud-based computing system through the virtual machine;

transferring the state of the computing environment from a primary storage server to the secondary storage server;

receiving a request to restore the computing environment of the source device to a previous state, wherein the received request includes a specified point in time for the computing environment of the source device, wherein the specified point in time identifies one of multiple configuration files corresponding to a respective one of multiple sets of data associated with the computing environment of the source device, wherein each of the multiple sets of data correspond to different points in time;

running a restoration interface, wherein the restoration interface is configured to enable a user to select the identified one of the multiple configuration files from the multiple configuration files to restore the computing environment of the source device, wherein the restoration interface is configured to automatically retrieve the identified one of the multiple configuration files in response to the user selection though the secondary storage server, and wherein the restoration interface is configured to selectively provide a status of sets of data that are scheduled for transfer, or that are pending transfer, to the secondary storage server;

receiving a request to restore the respective one of the multiple sets of data associated with the computing environment of the source device;

retrieving the requested one of the multiple sets of data through the secondary storage server; and restoring the previous state of the computing environment of the source device using the retrieved one of the multiple configuration files and the retrieved one of the multiple sets of data, wherein the computing environment of the source device includes a file system and sets of data within the file system of the source device.

2. The method of claim 1, further comprising:

generating the configuration file for the computing environment;

copying data stored within the computing environment;

transferring the generated configuration file and the copied data to the secondary storage server.

3. The method of claim 1, wherein the retrieved configuration file is an xml file containing one or more system parameters of the computing environment.

4. The method of claim 1, wherein the restoration interface is configured to monitor a storage capacity of the secondary storage server and the cloud-based computing system.

5. A system for restoring a source computing environment, the system comprising:

a memory;

a processor coupled to the memory and configured to execute instructions stored in the memory;

a secondary storage component, wherein the secondary storage component is configured to transfer a state of the source computing environment to a cloud-based computing system, wherein the state of the source computing environment presents a point in time for the source computing environment, wherein the cloud-based computing system hosts a bootable non-transitory computer-readable storage medium, wherein the state of the source computing environment includes a configuration file and sets of data associated with the source computing environment, and wherein the secondary storage component hosts a virtual machine and accesses the cloud-based computing system through the virtual machine;

a primary storage component, wherein the primary storage component is configured to transfer the state of the source computing environment through the secondary storage component;

a request component, wherein the request component is configured to receive a request to restore the source computing environment at a specified point in time, wherein the specified point in time identifies one of multiple configuration files corresponding to a respective one of multiple sets of data associated with the source computing environment, wherein each of the multiple sets of data correspond to different points in time;

a configuration component, wherein the configuration component is configured to configure a restoration interface using the one of the multiple configuration files associated with the source computing environment, wherein the restoration interface is configured to enable a user to select the one of the multiple configuration files from the multiple configuration files to restore the source computing environment, and wherein the restoration interface is configured to selectively provide a status of sets of data that are scheduled for transfer, or that are pending transfer, through the secondary storage component; and a retrieval component, wherein the retrieval component is configured to automatically retrieve data associated with the source computing environment in response to selection of the one of the multiple configuration files, wherein the memory includes one or more of the components.

6. The system of claim 5, wherein the configuration component is configured to configure the restoration interface using an xml file containing system configuration parameters of the computing environment.

7. The system of claim 5, wherein the configuration component is configured to configure the restoration interface using an xml file containing system configuration parameters of the source computing environment that is stored by the secondary storage component.

8. The system of claim 5, wherein the retrieval component is configured to retrieve a secondary copy of the data associated with the source computing environment through the secondary storage component.

9. The system of claim 5, wherein the configuration component is configured to configure the restoration interface using an xml file containing system configuration parameters of the source computing environment that is stored in the cloud-based computing system, and wherein the retrieval component is configured to retrieve a secondary copy of the data associated with the source computing environment through the secondary storage component.

10. The system of claim 5, wherein the restoration interface is configured to monitor a storage capacity of the one or more secondary storage devices.

11. A system for recovering a computing environment to a previous backup state, the system comprising:
- a memory;
- a processor coupled to the memory and configured to execute instructions stored in the memory;
- a secondary storage component, wherein the secondary storage component is configured to transfer previous states of the computing environment to a cloud-based computing ststem,
  - wherein each of the previous states of the computing environment represents a point in time for the computing environment,
  - wherein the cloud-based computing system hosts a bootable non-transitory computer-readable storage medium,
  - wherein each of the previous states includes a configuration file and a set of data associated with the computing environment for a point of time,
  - wherein the secondary storage component hosts a virtual machine and accesses the cloud-based computing system through the virtual machine;
- a primary storage component, wherein the primary storage component is configured to transfer the state of the computing environment through the secondary storage component; and
- a restoration component, wherein the restoration component is configured to retrieve the previous states of the computing environment through the secondary storage component,
  - wherein the restoration component includes a restoration interface configured to enable a user to select a configuration file from a plurality of configuration files to restore the computing environment,
  - wherein the restoration interface is configured to selectively provide a status of sets of data that are scheduled for transfer or that are pending transfer to the cloud-based computing system or to secondary storage component,
  - wherein the restoration interface is configured to monitor a storage capacity of the cloud-based computing or a storage capacity of the secondary storage component,
  - wherein the restoration component is configured to restore the computing environment to a previous backup state,
  - wherein the memory includes one or more of the components, and
  - wherein when a network connection between the system and the client is unavailable, the restoration component is configured to transfer a previous state of the computing environment to the non-transitory computer-readable medium to enable a bootable recovery of the client at a location of the client.

12. The system of claim 11, wherein the restoration component is configured to restore the computing environment to the previous backup state by:
- provisioning the restoration interface; and
- configuring the provisioned interface using an xml file containing configuration parameters associated with the previous state of the file system.

13. The system of claim 11, wherein the restoration component is configured to restore the computing environment to the previous state by:
- booting the non-transitory computer-readable storage medium previously hosted by the cloud-based computing system to provision a host machine; and
- configuring the host machine using an xml file containing configuration parameters associated with the previous state of the computing environment.

14. The system of claim 11, wherein the restoration component is configured to restore the computing environment to the previous state by:
- booting the non-transitory computer-readable storage medium previously hosted by the cloud-based computing system to provision a host machine; and
- configuring the host machine using an xml file containing a system configuration associated with the previous state of the computing environment.

* * * * *